Aug. 19, 1958      F. KESSELRING ET AL      2,848,678
ELECTROMAGNETIC RECTIFIER
Filed Aug. 2, 1952                              3 Sheets-Sheet 1
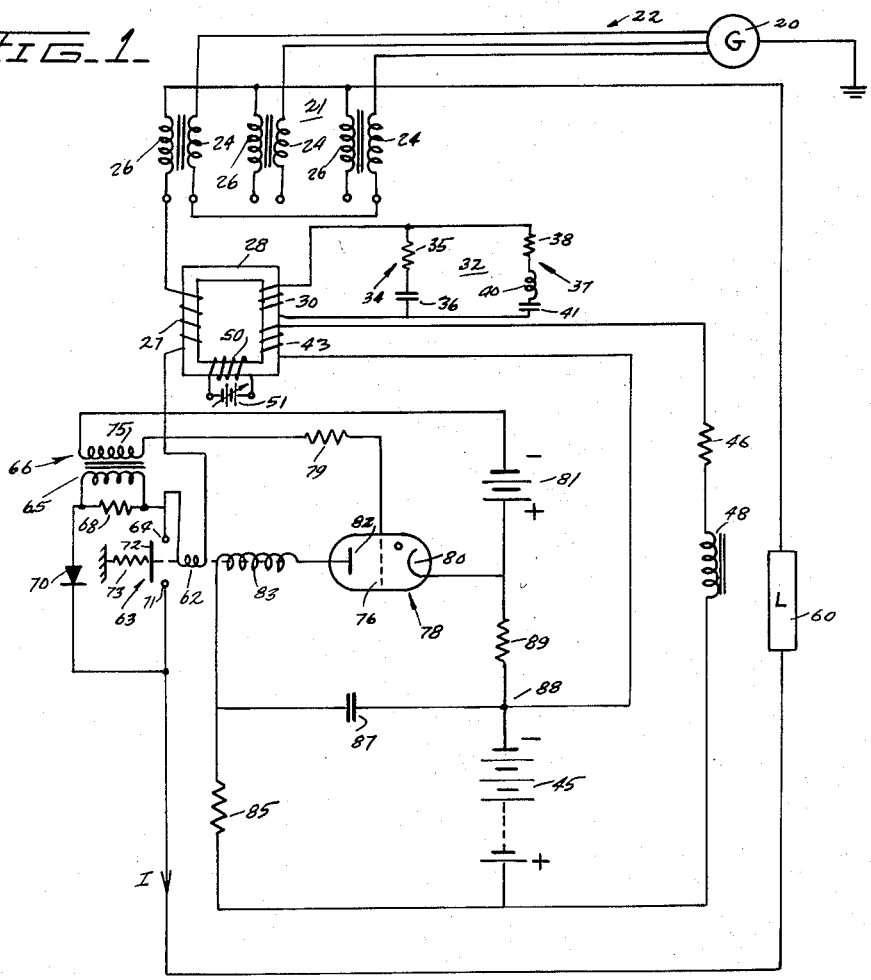
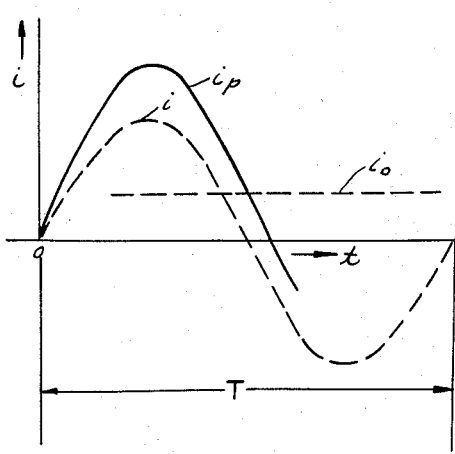
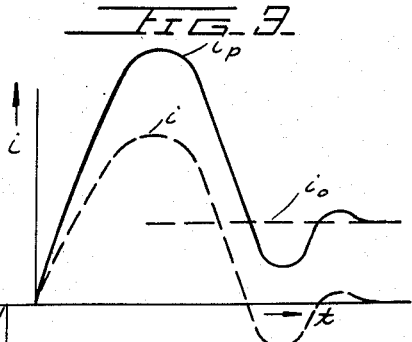
INVENTORS.
FRITZ KESSELRING
ERWIN WETTSTEIN
BY  ALFRED SPAELTI
Ostrolenk & Faber
ATTORNEYS

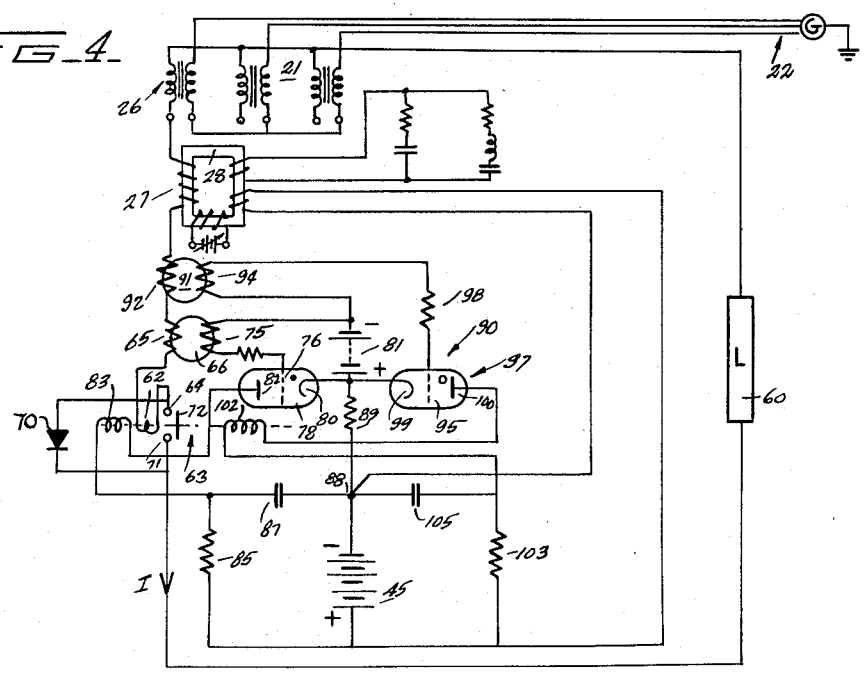
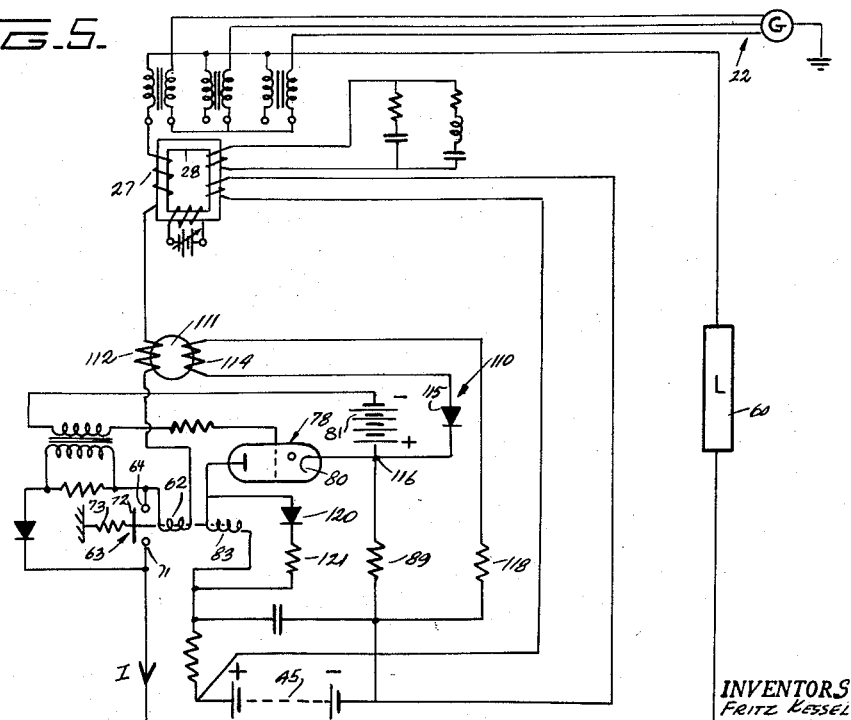

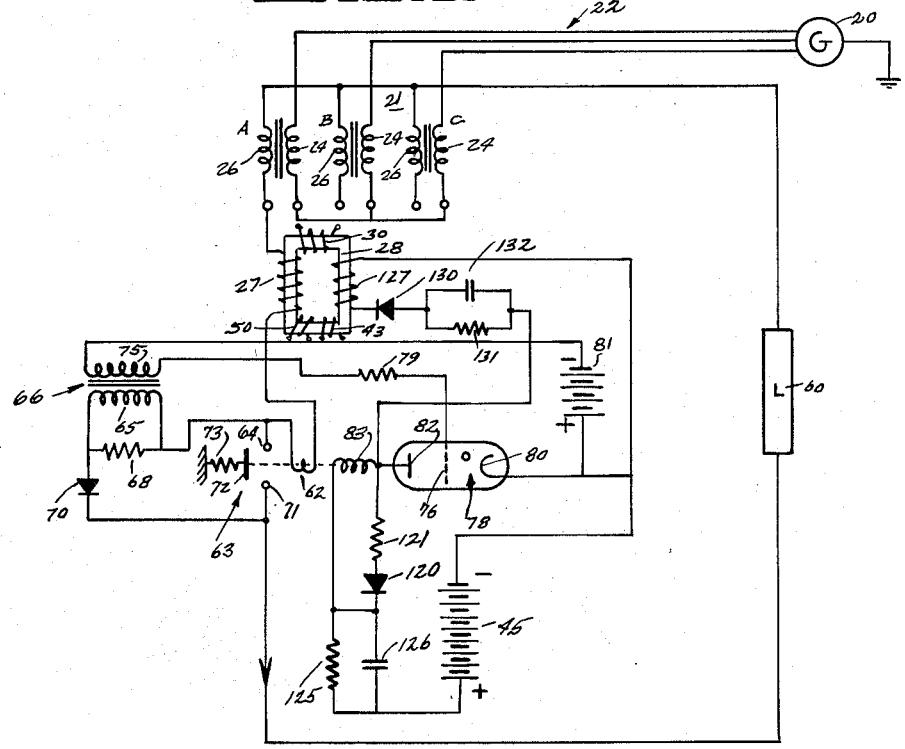

2,848,678
Patented Aug. 19, 1958

2,848,678

ELECTROMAGNETIC RECTIFIER

Fritz Kesselring, Zollikon-Zurich, and Erwin Wettstein and Alfred Spaelti, Zurich, Switzerland, assignors to FKG Fritz Kesselring Gerätebau A. G., Bochtobel-Weinfelden, Thurgau, Switzerland, a corporation of Switzerland Application August 2, 1952, Serial No. 302,316

3 Claims. (Cl. 321—48)

Our present invention relates to rectifiers and more particularly it relates to electromagnetically operated rectifiers.

A vacuum tube, a gas tube or mercury vapor rectifier may actually present a very large resistance to current flow in one direction, but they present also a certain resistance to the current flow in the other direction. Since it is this latter current flow that is utilized at the load, any resistance in the circuit between the energy supply and the load produces an unwanted loss.

Mechanical rectifiers such as the one described in application Serial No. 212,017, filed February 21, 1951, now Patent No. 2,693,569, present practically infinite resistance in one direction of current flow and zero resistance in the opposite direction. In these rectifiers such an operation is possible because of the use of switching elements which open when the current flow is in one direction and close when the current flow is in the opposite direction. These switching elements of mechanical rectifiers are usually mounted on rotating equipment operating in synchronism with the alternating current to be rectified.

The major disadvantage of mechanical rectifiers is that they have many moving parts in comparison to electronic rectifiers of the first group. Furthermore, in mechanical rectifiers, the time in which the switches open or close is very critical since the switching operation must occur when the load current or the current flowing through the rectifiers is a minimum, possibly zero.

If a sixty cycle alternating current is to be rectified, it is found that the switching operation must occur within twenty or thirty microseconds at most.

The major distinction between electromagnetic and mechanical rectifiers is that electromagnetic rectifiers do not have any rotating devices since the only movable elements are the relay operated switches.

In the case of electromagnetic rectifiers, the major problem is that of operating switches at the correct time during each cycle of operation so that the switch contacts open or close at approximately zero current so that no damaging effect like melting of the contacts may occur.

Our novel electromagnetic rectifier is controlled electronically so that the relay contacts are opened at the desired time and closed at the desired time. The control circuit is by-passed during the operating interval so that no additional loss occurs in the rectifier.

The main object of the present invention is, therefore, an electronically controlled electromagnetic rectifier.

Another object of the present invention is the provision of means whereby the efficiency of an electromagnetic rectifier approaches that of an ideal rectifier.

A further object of our present invention is the provision of means for practically eliminating any loss in the circuit of an electromagnetic rectifier during its conduction period.

Our novel electromagnetic rectifier makes use of saturable core reactors for the purposes described in the above-mentioned application. In that application saturable reactors are provided with appropriate circuits called pre-magnetization circuits and straightening circuit.

The pre-magnetization circuit is essentially a D. C. biasing device connected to a winding on the core of the reactor and serves to move the hysteresis loop of the saturable core to a desired position, so that a flat step is produced at the beginning and end of each positive ½ cycle of current, the first step having a finite but small current magnitude, the second step being at approximately zero current.

The straightening circuit consists of electrical elements connected to another winding on the saturable core. Their function is to straighten the hysteresis loop so that it acquires an approximately rectangular shape. In other words, a straightening circuit changes the sloping lines of a hysteresis loop into approximately straight lines. Obviously the resulting hysteresis loop will not be a perfect rectangle and the vertical "straightened" lines will still have a certain slope.

The current to be rectified is made to pass through the saturable core reactor and if originally sinusoidal because of the effect of the saturable core reactor with the almost rectangular hysteresis loop becomes a sinusoidal wave with flat steps at and around the point at which the current goes from negative to positive values and at or around points at which the current goes from positive to negative values.

In our novel rectifier the current to be rectified is derived from the secondary of a transformer, is passed through the saturable core reactor through a winding on the reactor and is then made to flow through a relay coil. From the relay coil it flows to the load circuit as hereinafter described.

The relay consists of a bridging movable contact and a pair of stationary contacts. When the movable contact bridges the stationary contacts, current flows directly from the secondary of the transformer to the load through the relay coil. When the relay is open, the current flows from the secondary of the transformer through the relay coil, a small rectifying device and thence to the load.

We have provided in addition in series with the small rectifier a circuit consisting of the primary of a transformer. The secondary of this transformer is connected to the grid of a gas tube. The cathode to plate circuit of this gas tube consists of a resistance, a capacitor and another winding of this relay. The capacitor is further connected across a circuit consisting of a resistance and a power supply.

A second structure consisting of a transformer, a gas tube and an output circuit for the tube similar to the first one is connected in opposition of phase to this first structure so that the two tubes are energized alternately, once every cycle, the first tube for example at the positive half cycle, the second tube at the negative half cycle.

Considering first just the first structure, it will be recalled that because of the provision of a saturable core reactor the current flowing at the beginning of the positive half cycle is small and its shape with respect to time is that of a rectangular step having a final current magnitude. Such a step, because of the inductance of the primary winding of the control transformer is transformed into a pulse varying exponentially with time, thus causing a secondary voltage to appear in the secondary of the control transformer.

The secondary of the control transformer is then energized and applies a positive pulse to the grid of the gas tube. It will be assumed that when such a pulse is applied to the gas tube the capacitor connected in parallel with the D. C. supply is completely charged.

Under such conditions when a positive pulse is applied to the grid of the gas tube, the gas tube will start conducting and a current will flow in the plate circuit of the gas tube.

We can consider the current flowing through the tube to be made of two components, one due to the power supply, one due o the discharge of the above-mentioned capacitor. The current due to the capacitor will generally be an oscillating current.

At the beginning of each cycle of operation both component currents are positive so that their resultant will be a relatively large current which will flow through the second winding of the relay. The second winding of this relay, also called the auxiliary winding, now aids the first winding on the relay to move the bridging contact toward the stationary contact, but as previously mentioned the current due to the discharge of the capacitor is an oscillator current so that after going through a positive half cycle it will reverse and become negative sufficiently to de-energize the auxiliary relay and cause the bridging contact to open the circuit again.

This undesirable effect is overcome in our novel rectifier by making the resistance in the cathode to plate circuit of the gas tube of sufficient magnitude so that the discharge current from the capacitor while still oscillating becomes aperiodic.

Furthermore, in our novel rectifier we select a D. C. supply of a large enough potential to produce a large D. C. current flow through the gas tube. Under such conditions the current flowing through the gas tube will never go negatively or, in other words, the gas tube will remain conductive and the auxiliary winding energized. This results in the bridging contact remaining in the closed position.

The conducting tube must be de-energized to release the bridging contact and open the stationary contacts at the end of the positive cycle. This may be done in a number of ways, for example, by the use of a second circuit similar to the first one or by the use of a circuit which is energized only at the beginning of the negative half cycle to stop the conduction of the tube.

When a second circuit similar to the first one is used in our novel rectifier, then it can be provided with a second auxiliary coil to pull the movable contact member away from the stationary contacts during the negative half cycle of the alternating wave.

By the use of two of such control circuits, the bridging contact is, therefore, pulled to its closed position at the positive half cycle and pulled to its open position at the beginning of the negative half cycle. This makes possible the removal of a biasing spring which in previous electromagnetic rectifiers was used to bias the bridging contact in the open position.

Accordingly, another object of the present invention is the provision of means for eliminating mechanical biasing devices in an electromagnetic rectifier.

Removal of a spring and the substitution therefor of an electrical circuit as an advantage may be easily realized when one takes into account that springs after a certain number of operations change their elasticity and their biasing force on the bridging contact.

Moreover, since the spring is operated every cycle it will become unusable only after relatively short periods of use.

The change in the biasing force of the spring may also cause the bridging contact to close not exactly at the desired time.

All these disadvantages are eliminated in our novel rectifier with an electronic control circuit when an auxiliary relay is substituted for such a biasing spring.

It is to be noted that the circuit applying the pulse to the control tube is by-passed when the bridging contact is in its closed position so that when the electromagnetic rectifier is in its operative cycle no additional loss is caused by the control circuit.

In previous electromagnetic rectifiers, on the other hand, the controlling pulse was obtained by means of a secondary winding on the saturable core. In the latter rectifiers, therefore, a loss was experienced during the cycle of operation of the rectifier.

Another object of our present invention is, therefore, the provision of means for increasing the efficiency of electromagnetic rectifiers.

It will be noted that the current for energizing the auxiliary winding of the relay is obtained from a separate power source (D. C. supply) and not from the load circuit. If such an energizing current had been obtained from the load circuit at the moment of closing of the contacts, a relatively large current would have flown in the load circuit thus defeating the effect of the saturable core reactor and producing closing of the contacts at relatively high currents.

Accordingly, another object of the present invention is the provision of means whereby the closing operation occurs when a very small current flows in the load circuit.

The function of the main winding of the relay is to provide sufficient ampere turns during the conductive half cycle, so that as the load current increases or decreases during the conductive half cycle, so does the pressure with which the stationary contacts are engaged by the bridging contacts.

A further object of the present invention is therefore, an electromagnetic rectifier in which the contacts at the rectifying element increases or decreases as a function of the load circuit.

The foregoing and many other objects of the invention will become apparent in the following description and drawings in which:

Figure 1 is an electrical diagram to explain the operation of the control circuit of our novel electromagnetic rectifier.

Figure 2 is an illustration of the wave shapes of the currents flowing in our novel control circuit.

Figure 3 is another illustration of the current flowing in our novel control circuit when the correct magnitudes of the electrical constants are chosen.

Figure 4 is a complete electrical diagram of our novel electromagnetic rectifier shown applied to a single phase of a multi-phase system.

Figure 5 is a modification of our novel electromagnetic rectifier.

Figure 6 is another modification of our novel electromagnetic rectifier.

Figure 7 is that of a three-phase voltage wave.

Figure 8 is a plot of the load circuit obtainable in our novel electromagnetic rectifier where a voltage as shown in Figure 7 is applied to it.

Figure 9 is the hysteresis loop of our saturable core reactor.

Referring first to Figure 1 showing the circuit diagram of the simplified embodiment of our novel electro-magnetic rectifier a generator 20 is there shown connected to a three phase transformer 21 through feeders 22. Feeders 22 are actually connected to the primaries 24 of transformers 21. The primaries 24 are connected in Y although any suitable connection may be used. The secondaries 26 of transformer 21 are also connected in Y although again any other suitable connection may be used.

In the present description we will refer to only one phase A of this three phase system with the understanding that similar rectifiers are connected to the other two phases B and C. Considering now the first phase A, the secondary 26 of transformer 21 is connected to a winding 27 on a core of saturable type material 28. On the same core 28 is wound a second coil 30 connected to a so-called straightening circuit 32 described for example in application Serial Number 212,017, filed on February 21, 1951. The straightening circuit 32 consists of two branches in parallel. One branch 34 comprises a resistance 35 in series with the capacitance 36 while the other branch 37 consists of a resistance 38, an inductance 40, and a capacitance 41 where the elements 38, 40 and 41 are connected in series.

A third coil 43 is wound on the saturable core 28. This winding 43 generally known as the premagnetization winding is connected to D. C. supply 45 through a series circuit consisting of resistance 46 and reactor 48. A second premagnetization winding 50 is wound on the saturable core 28. This second premagnetization winding is energized by means of a variable D. C. supply 51.

The function of the saturable core 28 and the windings 30, 43 and 50 as described in detail in the above mentioned application is that of flattening the sinusoidal waves from the secondary 26 of transformer 21 around the point at which they cross the zero axis or reference time axis as shown in Figures 7 and 8. The two premagnetization windings 43 and 50 serve to bias the saturable core 28 to a preselected value as shown in Figure 9 and as described in the above mentioned application.

As can be seen from Figure 9 the hysterisis loop of the saturable core with the straightening winding 30 is approximately rectangular and as shown therein, is biased by windings 43 and 50, so that when the current becomes positive, at $a$, and increases in the direction of the arrow 52, it can first develop freely with practically no reactance due to the flat portion $a$—$b$ of the hysterisis loop. The load current of this phase $i_A$ then takes the wave shape shown in Figure 8, portion $a$—$b$, where portion $a$—$b$ is essentially similar to the voltage wave, namely sinusoidal.

At $b$ the reactance of the core 28 becomes very large so that until the current reaches point $c$, the corresponding wave-shape of the load current $i_A$ is a horizontal line $b$—$c$.

At $c$ the core is saturated and presents practically zero reactance so that the load current $i_A$ may take approximately sinusoidal shape, similar to the wave of the voltage of the secondary 26 of three-phase transformer 21.

When on the other hand the load current is decreasing in the direction shown by the arrow 53 because of the particular bias selected, the flat step will occur when the current is practically equal to zero as shown at $d$—$e$ of the hysteresis loop of Figure 9 and at $d$—$e$ of the current waves of Figure 8.

To summarize the above, the bias produced by windings 43 and 50 serves to produce flat steps of different current values at the beginning and end of the positive half cycle of the current wave. It will be noted that although we have described only one phase, A, of the three-phase system, in both Figures 7 and 8, we have shown the voltage and current waves respectively as they actually appear in a complete three-phase system A, B, C.

The straightening winding 30 serves to straighten out the sloping lines of the hysterisis loop characteristic of the saturable core 28. The function of winding 30 is in other words to transform the hysterisis loop of core 28 into a primarily rectangular loop as shown in Figure 9 so that below saturation, core 28 will present practically infinite reactance, while above saturation core 28 will present practically zero reactance. The combined action of windings 30, 43 and 50 is therefore such that (see Figures 7 and 8) if the voltage wave $i_A$ as obtained from the phase A of the secondary 26 of transformer 21 is applied on the winding 27 of the core 28 a current having a wave shape similar to that shown at $i_A$ in Figure 8 will flow through the winding 27 and the load 60. From Figure 8 it will be seen that the wave $i_A$ representing the current flow through winding 27 is not a perfect sine wave since it has practically flat portions $b$—$c$ and $d$—$e$ at approximately the points where the original sine wave should have crossed the reference or zero axis.

It is necessary to point out that the time length of portions $b$—$b$ and $d$—$e$ have been exaggerated with respect to the sinusoidal portion of wave $i_A$ for making clearer the function of the saturable core 28.

Winding 27 is connected in series to the main winding 62 of relay 63. Main winding 62 is connected in turn to stationary contact 64 and the primary winding 65 of control transformer 66. In parallel with the primary winding 65 of control transformer 66 is connected a resistance 68 across which will appear a pulsing voltage from winding 27. The parallel combination of winding 65 and resistance 68 is then connected in series with main winding 62 and rectifier device 70. Rectifying device 70 may be of any known type, either vacuum or solid and it should have a relatively low forward breakdown voltage. The other side of rectifier 70 is connected to a second stationary contact 71 and thence to the load 60 and back to ground.

Relay 63 having the main winding 62 is provided with a movable bridging contact 72 biased by spring 73 away from the stationary contacts 64 and 71. At the beginning of each current cycle when relay 63 is still open, Figure 8, the current flowing through resistance 68, rectifier 70 and load 60 increases first rapidly as at $a$—$b$ of Figure 8 and then flattens at $b$—$c$ due to saturation of core 28. The variable current $a$—$b$ flows through resistance 68 with no time lag, while it increases exponentially through the inductance of primary winding 65 of transformer 66. Such a time varying current across primary 65 causes secondary 75 of transformer 66 to become energized, as is well known in the art, so that until the current in winding 65 increases to its final or steady state value, a voltage appears across the secondary winding 75 of transformer 66. It will be easily seen that such a secondary voltage may continue to exist even during interval $b$—$c$ of curve $i_A$, since the time interval required to reach approximately the steady state or final value of current in winding 65 is merely a function of the time constant due to the inductance and resistance of winding 65 and of the resistance of winding 68.

The small current $b$—$c$ of $i_A$ passing through the relay main winding 62 is not sufficient to produce the necessary ampere turns to cause the operation of the relay 63 to its closed position, but it will produce a voltage pulse across the primary winding 65 of control transformer 66 and therefore a secondary voltage across secondary 75 of transformer 66.

Assuming now that capacitance 87 is fully charged and that a voltage pulse appears across the primary 65 of control transformer 66 due to the transient current $a$—$b$ (see Figure 8) a positive pulse will appear at the grid 76 of gas tube 78. If the gas tube 78 starts conducting, a current $i_p$ (Figures 2 and 3) flows through the auxiliary winding 83 of relay 63 and produces the necessary ampere turns to operate the relay 63 to its closed position. The number of ampere turns produced by the auxiliary relay 83 actually adds to the ampere turns of main winding 62 to move the bridging contact 72 from its non-operative position to its operative position when it bridges the stationary contacts 64 and 71. When the stationary contacts 64 and 71 are bridged by the movable contact 72 current will flow from the secondary 26 and transformer 21 through winding 27 through the main relay winding 62, contact 64, 72, 71, through load 60 to ground, by passing transformer 66 and rectifier 70.

When gas tube 78 conducts we can assume that the current $i_p$ flowing through it is made of two component currents, $i_o$ and $i$. The component current $i$ is the discharge current of capacitance 87 and if the value of the resistance 89 is small with respect to the ratio of the inductance 83 and capacitance 87 current $i$ will be an oscillating periodic wave as shown in Figure 2 by the dotted line. Current $i_o$ is the current flowing through tube 78 due to the D. C. supply 45 and will, therefore, be a constant current shown dashed line in Figure 2.

The magnitude of the constant current $i_0$ is, of course, determined by the plate supply 45, the resistance 85, and the resistance of winding 83.

It was previously pointed out that as soon as gas tube 78 starts conducting stationary contacts 64 and 71 are bridged by the movable contact 72 so that the current from the secondary 26 and transformer 21 by-passes the control circuit including the transformer 66. Under these conditions no voltage is supplied to the grid 76 of gas tube 78 but tube 78 will continue to conduct due to well-known properties of gas tubes. That is, tube 78 will continue to conduct until the plate to cathode voltage goes below a certain value, depending upon the type of gas tube used.

We will assume first that the resistance 89, the inductance 83 and the capacitance 87 have values such that the following relationship is satisfied, namely that the resistance R(89) is less than $$\sqrt{\frac{4L}{C}}$$

Where R is the resistance of resistor 89, L is the inductance of winding 83 and C is the magnitude of capacitance 87.

When such a relationship is satisfied the discharge current from capacitance 87 is periodic in nature, meaning that the current $i$ (see Figure 2) will tend to go from positive values to negative values crossing the zero or reference axis.

Due to this particular shape of the current $i$ the resultant current $i_p$ flowing through the gas tube 78 and obtained as the sum of the current $i$ and $i_0$ will also tend to go from positive values to negative values, as shown in Figure 2.

When the current $i_p$ reaches the zero axis and then tends to go negatively gas tube 78 stops operating since, when current $i_p$ crosses the zero axis practically no voltage is applied between the cathode 80 and the plate 82 of gas tube 78.

It will be seen, therefore, that when the value of resistance 89 is so chosen that the above relationship is satisfied, gas tube 78 will stop its discharge very quickly as soon as the resultant current $i_p$ reaches the zero value. This means that after the energization of relay 63 winding 83 will become de-energized, permitting the bridging contact 72 to return to its non-operated position under the biasing action of spring 73. This occurs because the ampere turns produced by main winding 62 are not yet sufficient to hold the bridging contact 72 in its operated position.

This may be understood more clearly after it is pointed out that interval T (see Figure 2) actually corresponds to a very small portion of wave segment b—c of Figure 8.

To summarize the above, when the value of resistance 89 satisfies the above relationship, the rectifier shown in Figure 1 will be inoperative, unless the time constant of the auxiliary relay circuit is so chosen that the current reversal shown in Figure 2 occurs after the load circuit $i_A$ has become sufficiently large to provide enough ampere turns at the main winding 62 of relay 63 to maintain armature 72 of relay 63 in its closed position.

Under such conditions, however, the opening operation of relay 63 becomes critical. In fact, as the load current decreases, so will the ampere turns of the main winding 62 of relay 63, until at some value of current greater than zero the bias of spring 73 becomes sufficient to move the armature to its open position, thereby opening the circuit when a still substantial load current flows through it.

As is well known in the art, opening under large current flow may cause considerable damage to contacts 64, 71 and 72.

It is necessary to point out that this may be remedied by adding turns to the main winding 62, but if this is done winding 62 may, first of all, maintain the armature 72 closed even after step d—e is finished, causing a reverse current flow in the load 60 or, because of the inertia of the bridging contact under the biasing action of spring 73, may move too late, when the current has already gone negative. This defect may be overcome, as will be later described, by the use of a flip-flop control circuit.

When, on the other hand, the resistance 89, the inductance of coil 83 and the capacitance of capacitor 87 satisfy the relations that are greater than $$R > \sqrt{\frac{4L}{C}}$$

then the discharged current $i$ of capacitor 87 will be aperiodic and may have the general shape shown in Figure 3.

If, furthermore, the value of resistance 85 and the voltage of the D. C. supply 45 are such that the D. C. current $i_0$ is relatively large, the total current $i_p$ will be as shown in Figure 3. In Figure 3, in fact, $i_p$ never becomes negative because of the particular selection of the magnitude of resistance 89, resistance 85 and the voltage of D. C. supply 45. When, therefore, the correct values are chosen for these components, gas tube 78 will continue to conduct until, by separate means described hereinafter, its conduction is stopped by lowering the plate-to-cathode voltage.

Referring now to Figure 4 showing the actual embodiment of our novel electromagnetic rectifier, we have there given the same reference numerals to the parts that are similar to those of Figure 1.

A second control circuit 90 is used in conjunction with the first control circuit, comprising essentially the gas tube 78 to open the relay 63 when the current from the secondary 26 of transformer 21 becomes negative, thus overcoming the inertia of movable contact 72 and causing opening of the contacts at the desired time.

The control circuit 90 consists of a second control saturable core transformer 91 having its primary 92 in series with the primary 65 of control transformer 66 and winding 27 of saturable core reactor 28. The secondary 94 of second control transformer 91 is connected to the grid 95 of gas tube 97 through a resistance 98. Grid 95 of tube 97 is biased with respect to its cathode 99 by means of D. C. supply 81 which is in common with the first control circuit.

It will be noted that winding 94 is wound in opposition of phase with respect to winding 75 of saturable core transformer 66' so that while gas tube 78 becomes conducting at the positive half cycle of the load current $i_A$, tube 97 becomes conductive at the negative half cycle of the load current $i_A$.

Plate 100 of gas tube 97 is connected first to a second auxiliary winding 102 of relay 63 and then to a resistance 103. Resistance 103 is connected to the positive side of D. C. supply 45 on one side and on the other side, where it meets winding 102, to a capacitance 105. Cathode 99 is connected to the common terminal 88 through resistance 89, which is in common with the first control circuit.

It is now possible to examine the operation of our novel electromagnetic rectifier.

First it is necessary to point out that the magnitude of resistance 89 is such that the discharge current from capacitances 87 and 105 is aperiodic so that the resultant current $i_p$ flowing through either tube 78 or tube 97 never becomes negative.

Assuming now that tube 78 has been made conductive by a pulse produced through the interval 58 (see Figure 8) the control circuit of tube 78 is by-passed since the movable contact 72 is now bridging the stationary contacts 64 and 71. It will be seen from Figure 4 that movable contact 72 no longer needs a biasing spring such as biasing spring 73 of Figure 1. This will become apparent in the following description.

Although the control circuit of tube 78 is now bypassed, tube 78 continues to conduct since its plate-to-cathode voltage does not decrease below the critical value. Under these conditions, auxiliary winding 83 aids the ampere turns of the main winding 62 to hold the bridging contact 72 against the stationary contacts 64 and 71.

At the same time, the grid 76 of tube 78 has returned to its normal voltage with respect to the cathode 80 of tube 78, since no pulse now appears across the secondary 75 of transformer 66. At the end of the positive half cycle, a positive pulse is applied to grid 95 of the second control tube 97, thus firing control tube 97 and causing the energization of the second auxiliary winding 102 of relay 63.

At the same time, the current flowing through second control tube 97 will produce a voltage drop across resistance 89 in a direction to increase the potential of cathode 80 in a positive direction with respect to the potential of plate 82 of tube 78. The raising of the potential of cathode 80 with respect to the potential at the plate 82 corresponds to a lowering of the plate-to-cathode voltage of tube 78 and since no signal, or at most a negative signal is applied to the grid 76 of tube 78, tube 78 will become non-conducting.

As soon as tube 78 becomes non-conductive the first auxiliary winding 83 becomes de-energized so that the second auxiliary winding 102, now energized, will pull the bridging contact 72 in the open position against the pulling force produced by the main winding 62.

The pulling force produced by main winding 62 is of very small magnitude at this point due to the fact that the current flowing through the main winding 62 is very small, as can be seen in portion d—e of the curve shown in Figure 8.

By the addition of a second control circuit to the circuit shown in Figure 1, it is further possible to arrive at a rectifying action of the relay 63 such that the relay 63 will be in in its closed position during the positive half wave and in its open position during the negative half wave.

The cycle described above will be repeated as soon as the current becomes positive again to energize the first auxiliary winding 83 through the control tube 78 and to de-energize the second auxiliary winding 102 by discontinuing the conduction of tube 97. That is, during the non-conducting period of tube 78, the capacitor 87 is recharged and upon firing of tube 78 will cause conduction through tube 78 and extinction of tube 97 in the same way as tube 78 was extinguished in the previous half cycle. By this means, therefore, the current reaching the load 60 will be made of a number of positive half cycles to provide the desired direct current. The same controlling action at the negative half cycle of the current wave may be obtained by the circuits shown in Figure 5.

In Figure 5 we have denoted by the same numerals the elements which were described in Figure 1. The main addition is a control circuit 110 have a control saturable core transformer 111 with its primary 112 connected between winding 27 of saturable core 28 and the main winding 62 of relay 63. Relay 63 is of the kind described in Figure 1. That is, it is provided with a biasing spring 73 which normally biases the bridging contact in its open or non-operating position. Second control transformer 111 has its secondary winding 114 connected to a rectifying device 115 and thence to a connection point 116.

To the same connection point 116 are connected the cathode 80 of tube 78 and the resistance 89. The other side of winding 114 is connected to the negative side of power supply 45 through a resistance 118.

Assuming, now, that at the beginning of the positive half cycle the control tube 78 has fired and energized its auxiliary winding 83 the load current $i_A$ will flow from the winding 27 of saturable core 28, the primary 112 of transformer 111, the main winding 62 of relay 63, contacts 64, 72 and 71, to the load 60 and thence to ground.

During the positive half cycle, rectifier 115, which may be of any known type, is so connected with respect to winding 114 that no current flows in the rectifier circuit. At the beginning of the negative cycle, on the other hand, a current will flow in the circuit of rectifier 115, thus making the cathode 80 of control tube 78 considerably positive due to the voltage drop developed across resistance 89, by the current from rectifier 115.

As explained before, this causes tube 78 to stop its discharge, thus de-energizing the auxiliary relay 83 and causing the operation of the bridging contact 72 to its non-operated position under the bias of spring 73.

As shown as the current becomes positive again, tube 78 will fire while the voltage across resistance 89 due to the current flowing through rectifier 115 will become equal to zero and the cycle is thus repeated.

It will also be noted that in the circuit of Figure 5 the auxiliary winding 83 of relay 63 is paralleled by a circuit consisting of the rectifier 120 in series with the resistance 121. Rectifier 120 may be of any well known type, either vacuum or solid.

The function of the series circuit 120, 121 is that of dissipating the electromagnetic field of winding 83 when the gas tube 78 is extinguished at the end of the conducting half cycle. If the circuit 120, 121 is not provided, the extinguishing operation of tube 78 and consequent de-energization of auxiliary winding 83 becomes difficult and requires a higher positive potential at the cathode 80 of tube 78.

In other words, if the circuit 120, 121 is not provided across winding 83 of relay 63 the current pulse from the secondary 114 of transformer 111 must be of sufficient magnitude to raise the potential of cathode 80 of tube 78 to a value higher than if the circuit 120—121 is used. The necessity for such a higher voltage at the secondary 114 of transformer 111 causes a load on the primary 112 in the load circuit and, therefore, a larger current flow just when the bridging contact 72 moves away from the stationary contacts 64 and 71.

As is well known in the art, opening a circuit under such conditions causes frequent burning of the contacts 64, 71 and 72.

Rectifier 120 is connected so that when tube 78 is operating the current from the plate supply 45 flows through the auxiliary winding 83 and not through resistance 181 and rectifier 120. Rectifier 120, therefore, blocks the normal operating current which must flow through the auxiliary winding 83.

Referring finally to the electromagnetic rectifier shown in Figure 6, which also embodies our present invention, we have denoted by the same numerals the elements corresponding to those shown in Figure 1.

The plate circuit of tube 78 consists of the parallel combination of the auxiliary winding 83 of relay 63 in parallel with resistance 121 and rectifier 120. This parallel circuit operates as described in connection with Figure 5.

In series with the parallel circuit 83—120—121 is a second parallel circuit consisting of resistance 125 and capacitance 126. The parallel combination 125 and 126 is connected to the power supply 45 which in its turn is connected to ground; that is, to the cathode 80 of tube 78.

The plate 82 of tube 78 is also connected to a parallel circuit consisting of resistance 131 in parallel with the capacitance 132. This parallel circuit 131 and 132 is connected on the other side to a rectifier 130, which may use a vacuum or a solid tube in series with a secondary winding 127 wound on the saturable core 28.

The secondary winding 127 is connected on its other side to ground; that is, to the cathode 80 of tube 78.

It is now possible to understand the operation of the novel electromagnetic rectifier shown in Figure 6.

We shall assume, first, that at the beginning of the positive half cycle of current capacitor 126 is completely discharged while capacitor 132 is charged. Capacitor 132, for example, has been charged by the power supply 45 through the resistance 125 and resistance 131. Under these conditions if a positive pulse is applied to the grids 76 of tube 78, as described in connection with Figure 1, tube 78 will break down and will start conducting. A current from power supply 45 will then flow through resistance 125 and the winding 83 of relay 63 to cause the closing operation of relay 63, as also described in connection with Figure 1.

It will be seen that when tube 78 conducts a current will flow only from power supply 45 through resistance 125, winding 83 and tube 78 and no current will flow through the other plate-to-cathode circuit consisting of elements 127, 130, 131 and 132, since, as was mentioned previously, capacitor 132 is at this particular time completely charged to the full value of the plate-to-cathode voltage.

As soon as tube 78 conducts, capacitor 126 starts charging while at the same time capacitor 132 starts discharging through its respective circuits, namely resistance 135 and resistance 131.

The same positive pulse that causes the breakdown of tube 78 will also appear across the secondary winding 127 on the saturable core 28 but because of the particular connection of rectifier 130 no current will flow in the plate-to-cathode circuit 127, 130, 131 and 132.

When relay 63 is closed, as mentioned previously, the potential of grid 76 returns to its previous negative value determined by the grid bias supply 81, so that when at the end of the positive half cycle a negative pulse is introduced in winding 127 a current flow is produced in the cathode-to-plate circuit consisting of elements 127, 130, 131 and 132. Such a current is produced in the direction opposite to the current flow due to the power supply 45 through the tube 78.

In other words, while the conduction current from tube 78 flows from the plate 82 to the cathode 80, as convention dictates, when a negative pulse is applied to winding 127 due to the action of the saturable core 28 a current will tend to flow from cathode 80 to plate 82 of tube 78.

This second current tends to neutralize the first current and if it is sufficiently large it will be able to extinguish tube 78.

As soon as the extinguishing current flows through the circuit 127, 130, 131 and 132 capacitor 132 starts charging and reaches its full charge immediately after tube 78 has been extinguished.

When tube 78 is extinguished capacitor 132 starts charging by drawing a current from the power supply 45. At the same time capacitor 126 starts discharging through its resistance 125 so that at the beginning of the next positive half cycle the initial conditions are re-established and the positive pulse appearing at the grid 76 of tube 78 causes again the breakdown of tube 78 in the manner above described.

To summarize the above, our novel invention consists mainly of a control circuit for an electromagnetic rectifier deriving its energy indirectly from the load circuit. While, in the description, we have referred to and shown elements 45 and 81 as D. C. batteries, it is to be understood that in practice there will be actual power supplies energized by the alternating current supply.

In the foregoing we have described our invention in connection only with preferred and illustrated embodiments thereof. Since many variations and modifications of our invention are now obvious to those skilled in the art, we prefer to be bound not by the specific disclosures herein contained but only by the appended claims.

We claim:

1. An electromagnetic rectifier comprised of a commutating reactor, an electromagnetic switch, a closing circuit, and an opening circuit; said commutating reactor comprising a magnetic core and a main winding; said electromagnetic switch comprised of cooperating contacts having an engaged and disengaged position, a holding winding, a first auxiliary winding, and a second auxiliary winding; a rectifier connected in parallel with said cooperating contacts; said main winding of said commutating reactor connected in series with said holding winding and said cooperating contacts of said electromagnetic switch; first and second gas triode tubes, said closing circuit being comprised of a closed series connection including the plate and cathode of said first gas triode tube, a first resistor, a first source of plate voltage, and said first auxiliary winding; said opening circuit being comprised of a closed series connection including the plate and cathode of said second gas triode tube, said first resistor, a second source of plate voltage, and said second auxiliary winding; a first and second saturable transformer, said first and second saturable transformers each having a primary winding and a secondary winding; said primary windings connected in series with said main winding, said cooperating contacts and said holding winding; said secondary windings connected in the grid cathode circuit of said first and second gas triode tubes, respectively; said secondary winding of said first saturable transformer supplying a positive pulse to said grid of said first gas triode tube only when said last mentioned transformer is unsaturated and current in the primary winding thereof is increasing; said secondary winding associated with said second saturable transformer supplying a positive potential to the grid of said second gas triode tube only when said last mentioned transformer is unsaturated and the current in the primary winding thereof is decreasing.

2. An electromagnetic rectifier comprised of a commutating reactor, an electromagnetic switch, a closing circuit, and an opening circuit; said commutating reactor comprising a magnetic core and a main winding; said electromagnetic switch comprised of cooperating contacts having an engaged and disengaged position, a holding winding, a first auxiliary winding, and a secondary auxiliary winding; a rectifier connected in parallel with said cooperating contacts; said main winding of said commutating reactor connected in series with said holding winding and said cooperating contacts of said electromagnetic switch; first and second gas triode tubes, said closing circuit being comprised of a closed series connection including the plate and cathode of said first gas triode tube, a first resistor, a first source of plate voltage, and said first auxiliary winding; said opening circuit being comprised of a closed series connection including the plate and cathode of said second gas triode tube, said first resistor, a second source of plate voltage, and said second auxiliary winding; a first and second saturable transformer, said first and second saturable transformers each having a primary winding and a secondary winding; said primary windings connected in series with said main winding, said cooperating contacts and said holding winding; said secondary windings connected in the grid cathode circuit of said first and second gas triode tubes, respectively; said secondary winding of said first saturable transformer supplying a positive pulse to said grid of said first gas triode tube only when said last mentioned transformer is unsaturated and current in the primary winding thereof is increasing; said secondary winding associated with said second saturable transformer supplying a positive potential to the grid of said second gas triode tube only when said last mentioned transformer is unsaturated and the current in the primary winding thereof is decreasing; said first auxiliary winding effective to cause contact engagement when said first gas triode tube is supplied with a postive potential by said secondary winding of said first saturable transformer; said second auxiliary winding effective to cause contact disengagement when said second gas triode tube is supplied with a positive potential by said secondary winding of said second saturable transformer.

3. An electromagnetic rectifier comprised of a commutating reactor, an electromagnetic switch, a closing circuit, and an opening circuit; said commutating reactor comprising a magnetic core and a main winding; said electromagnetic switch comprised of cooperating contacts having an engaged and disengaged position, a holding winding, a first auxiliary winding, and a secondary auxiliary winding; a rectifier connected in parallel with said cooperating contacts; said main winding of said commutating reactor connected in series with said holding winding and said cooperating contacts of said electromagnetic switch; first and second gas triode tubes, said closing circuit being comprised of a closed series connection including the plate and cathode of said first gas triode tube, a first resistor, a first source of plate voltage, and said first auxiliary winding; said opening circuit being comprised of a closed series connection including the plate and cathode of said second gas triode tube, said first resistor, a second source of plate voltage, and said second auxiliary winding; a first and second saturable transformer, said first and second saturable transformers each having a primary winding and a secondary winding; said primary windings connected in series with said main winding, said cooperating contacts and said holding winding; said secondary windings connected in the grid cathode circuit of said first and second gas triode tubes, respectively, said secondary winding of said first saturable transformer supplying a positive pulse to said grid of said first gas triode tube only when said last mentioned transformer is unsaturated and current in the primary winding thereof is increasing; said secondary winding associated with said second saturable transformer supplying a positive potential to the grid of said second gas triode tube only when said last mentioned transformer is unsaturated and the current in the primary winding thereof is decreasing; said first auxiliary winding effective to cause contact engagement when said first gas triode tube is supplied with a positive potential by said secondary winding of said first saturable transformer; said first gas triode tube causing current flow through said first resistor and said first auxiliary winding when said secondary winding of said first saturable transformer supplies a positive potential to the grid thereof; said second gas triode tube causing a current flow through said first resistor and said second auxiliary winding when said secondary winding of said second saturable transformer supplies a positive potential to the grid thereof; said current flow through said first resistor effective to supply a positive potential to the cathode of said first gas triode tube to thereby render said last mentioned tube nonconductive; said current flow through said second auxiliary winding effective to cause disengagement of said cooperating contacts after said first gas tube stops conducting.

References Cited in the file of this patent

UNITED STATES PATENTS

| 1,265,354 | Mershon | May 7, 1918 |
| 2,230,571 | Koppelmann | Feb. 4, 1941 |
| 2,502,932 | Diebold | Apr. 4, 1950 |
| 2,691,128 | Wegener | Oct. 5, 1954 |

FOREIGN PATENTS

| 113,439 | Sweden | Mar. 13, 1945 |
| 613,540 | Great Britain | Nov. 30, 1948 |